UNITED STATES PATENT OFFICE.

FRANK NAROBE, OF NEW YORK, N. Y.

PROCESS OF MAKING BREAD.

1,224,492. Specification of Letters Patent. Patented May 1, 1917.

No Drawing. Application filed December 13, 1916. Serial No. 136,670.

*To all whom it may concern:*

Be it known that I, FRANK NAROBE, a subject of the Emperor of Austria, residing at New York, in the county of New York and State of New York, have invented new and useful Improvements in Processes of Making Bread, of which the following is a specification.

This invention relates to improvements in making bread and particularly a new type of bread, the entire loaf of which is substantially a crust.

The object of the invention is to provide a particularly palatable and nutritious form of bread, suitable to be used in connection with other foods of a liquid type, such as soups, milk and the like, the bread being of an extremely fragile nature, having a thin cross section, so as to crumble readily into relatively small particles, easily saturable with fluid foods.

Another object is to provide a bread which may be cooked with extreme rapidity and which possesses peculiar characteristics, unknown to other forms.

These and other objects are attained by the novel composition and process of baking, herewith described.

The dough mass from which the bread is baked consists in the intimate mixing and intermingling of the following substances, the proportions of which are substantially as given:

| | |
|---|---|
| Water | 10 qts. |
| Ordinary wheat flour | 30 lbs. |
| Common salt | 10 oz. |
| Sugar | 6 oz. |
| Butter | 2 oz. |
| Lard | 8 oz. |
| Yeast | 6 oz. |

After kneading the foregoing elements into a mass, it is set aside for a period of approximately three hours, a second kneading operation being then performed, again set aside for a period of one hour and then rolled into a very thin flat sheet, the sheets cut into the desired size and formed in any shape which may be preferred, disposed where the temperature will average 70 degrees for the next hour, whereupon the thin sheets are placed in an oven raised to a temperature of 400 degrees to 450 degrees Fah., for thirty seconds, the dough sheets reversed so that both sides shall be uniformly cooked, presenting a desirable brown appearance, the time consumed in baking being from three to four minutes only, whereupon the bread, which may be formed into loaves of any desired shape, is ready for disposal.

It is to be understood that if the sheets of dough are molded into a hollow form, the edges of one being joined to the other, that a loaf is produced simulating that of an ordinary loaf in its exterior appearance, but which is entirely hollow, the shell or crust having a thickness only of ordinary card board, thereby allowing thorough cooking operation to be performed, the weight of each loaf, prior to baking being possibly one half ounce. The finished product will be about one half of this amount, and consist of a hard baked shell only.

From the foregoing it will be evident that the shell may be crumbled into as fine particles as may be desired and that the same is especially adapted to be used in place of crackers, croûtons, or biscuit in connection with soups or used in place of a softer bread with milk.

A further use is in connection with the filling or dressing used with roasted meats, also in place of the bread known as zwieback.

Having thus described my invention, what I claim as new and desire to secure by Letters Patent is:—

1. The herein described steps of preparing dough and baking it as bread and comprising, a first kneading of the dough mixture, a second kneading after a rest period of approximately three hours, a rolling of the dough mixture into very thin flat sheets after a rest period of approximately one hour, an immediate preliminary heating for one hour followed by baking in a temperature of 400° to 500° Fah. for thirty seconds, and a reversing of the bread figures and a continuation of the baking for a period of from three to four minutes.

2. A process of baking bread, comprising subjecting the dough when in a raised condition, to a heat of 400 to 450 degrees Fah. for thirty seconds, reversing the sheet of dough and continuing the baking process for a period of from three to four minutes, whereby the sheet is baked thoroughly and completely.

In testimony whereof I have signed my name to this specification.

FRANK NAROBE.